(12) United States Patent
Takahashi et al.

(10) Patent No.: US 7,887,761 B2
(45) Date of Patent: *Feb. 15, 2011

(54) HONEYCOMB CATALYST AND MANUFACTURING METHOD THEREOF

(75) Inventors: Akira Takahashi, Nagoya (JP); Naomi Noda, Nagoya (JP); Yukio Miyairi, Nagoya (JP); Toshio Yamada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 786 days.

This patent is subject to a terminal disclaimer.

(21) Appl. No.: 11/907,371

(22) Filed: Oct. 11, 2007

(65) Prior Publication Data

US 2008/0044319 A1 Feb. 21, 2008

Related U.S. Application Data

(63) Continuation of application No. PCT/JP2006/317817, filed on Aug. 31, 2006.

(30) Foreign Application Priority Data

Aug. 31, 2005 (JP) .............................. 2005-250873
Sep. 30, 2005 (JP) .............................. 2005-287502

(51) Int. Cl.
*B01D 50/00* (2006.01)
(52) U.S. Cl. ..................................... 422/180
(58) Field of Classification Search .............. 422/168, 422/177, 180, 211, 212; 502/325; 55/523
See application file for complete search history.

(56) References Cited

U.S. PATENT DOCUMENTS

2004/0053781 A1  3/2004  Okawara

FOREIGN PATENT DOCUMENTS

| EP | 0 766 993 A2 | 4/1997 |
|---|---|---|
| JP | A 09-094434 | 4/1997 |
| JP | A 09-173866 | 7/1997 |
| JP | A 09-220423 | 8/1997 |
| JP | A 2002-221022 | 8/2002 |
| JP | A 2002-276338 | 9/2002 |
| JP | A 2003-033664 | 2/2003 |
| JP | A 2004-016931 | 1/2004 |
| JP | A 2004-105792 | 4/2004 |
| JP | A 2005-171805 | 6/2005 |

*Primary Examiner*—Tom Duong
(74) *Attorney, Agent, or Firm*—Oliff & Berridge, PLC

(57) ABSTRACT

This invention provides a honeycomb catalyst having an excellent purification efficiency and a small pressure loss and can be mounted even in a limited space, the honeycomb catalyst comprising: porous partition walls 4 having plural pores 25, which are arranged to form plural cells 3 allowing communication between two end faces; plugging portions being arranged to plug the cells 3 in one of the end faces; and catalytically active components 5, 15 loaded on surfaces of partition walls 4 and inner surfaces of pores 25, wherein many catalytically active component-loading pores 35 through which a gas can pass are formed in partition walls 4, and a ratio of a mass ($M_W$) of the catalytically active component loaded on the surfaces of partition walls 4 to a mass ($M_P$) of the catalytically active component 5 loaded on the inner surfaces of the pores 25 is ($M_W$):($M_P$)=1:3 to 3:1.

8 Claims, 5 Drawing Sheets

US 7,887,761 B2

HONEYCOMB CATALYST AND MANUFACTURING METHOD THEREOF

This application is a continuation of international application No. PCT/JP2006/317187 filed on Aug. 31, 2006, which claims the benefit of Japanese Patent Application No, 2005-287502 filed Sep. 30, 2005 and Japanese Patent Application No, 2005-250873 filed Aug. 31, 2005. The disclosure of the prior applications is hereby incorporated by reference herein in its entirety.

TECHNICAL FIELD

The present invention relates a honeycomb catalyst for preferable use in purification of unpurified components such as carbon monoxide (CO), hydrocarbon (HC), nitrogen oxide ($NO_x$) and sulfur oxide ($SO_x$) contained in exhaust gases discharged from fixed engines, combustion devices and the like for cars, construction machines and industries.

BACKGROUND ART

At present, a catalyst of a honeycomb structure (a honeycomb catalyst) has been used in purifying exhaust gases discharged from various engines and the like. As shown in FIG. 6, this honeycomb catalyst has a structure in which a catalytic layer 15 is loaded on the surface of a partition wall 4 constituting a cell 3. Further, as shown in FIGS. 4 and 5, to purify the exhaust gas by use of this honeycomb catalyst (a honeycomb structure 11), the exhaust gas is flowed into the cells 3 of the honeycomb catalyst from one end surface 2a side, brought into contact with a catalytic layer (not shown) on the surfaces of the partition walls 4, and then discharged to the outside from the other end surface 2b side (see, for example, Patent Document 1).

When such a honeycomb catalyst is used to purify the exhaust gas, transmission of unpurified components contained in the exhaust gas from the exhaust gas toward the catalytic layer on the surface of the partition wall must be promoted as much as possible to improve a purification efficiency. In order to improve the purification efficiency of the exhaust gas, for example, a hydraulic diameter of the cell must be reduced, and a surface area of the partition wall must be increased. Specifically, for example, a method of increasing the number of cells per unit area (a cell density) is adopted.

Here, it is known that a transmission rate of unpurified components from the exhaust gas toward the catalytic layer on the surface of the partition wall is increased in inverse proportion to a square of the hydraulic diameter of the cell. Therefore, the transmission rate of the unpurified components is improved as the cell density is increased. However, a pressure loss also tends to increase in inverse proportion to a square of the hydraulic diameter. Accordingly, there is a problem that the pressure loss is increased with an improvement in the transmission rate of the unpurified components.

Incidentally, a thickness of the catalytic layer on the surface of the partition wall is usually approximately several-ten μm. Here, if a spreading speed of the unpurified components in the catalytic layer is insufficient, a purification efficiency of the honeycomb catalyst tends to be lowered. This tendency is considerable especially under low-temperature conditions. Therefore, in order to increase the purification efficiency for the exhaust gas, it is necessary not only to increase the surface area of the catalytic layer but also to reduce the thickness of the catalytic layer to improve a spreading speed of the unpurified components in the catalytic layer. Accordingly, there is an advantage that the surface area of the catalytic layer becomes large when the cell density is increased and, on the other hand, there is a problem that the pressure loss is increased.

In order to reduce the pressure loss while increasing the purification efficiency for the exhaust gas, an inflow diameter of the honeycomb catalyst must be enlarged and a flow rate of the circulated exhaust gas must be lowered. However, when the honeycomb catalyst is grown in size, for example, a mount space for an in-vehicle honeycomb catalyst or the like is limited, and hence mounting the honeycomb catalyst becomes difficult in some cases.

Patent Document 1: JP-A-2003-33664

DISCLOSURE OF THE INVENTION

The present invention has been developed in view of such problems in the conventional art, and an object of the present invention is to provide a honeycomb catalyst which is superior in the purification efficiency, has a low pressure loss, and can be mounted even in a limited space, and to provide a manufacturing method thereof.

As a result of positively performing examinations to achieve the above-mentioned object, the present inventors have found that the object can be achieved by loading a catalytically active component on a surface of a partition wall and an inner surface of a pore in a honeycomb structure respectively and making an amount of the catalytically active component loaded on the surface of the partition wall and an amount of the catalytically active component loaded on the inner surface of the pore within a predetermined ratio, thus bringing the present invention to completion.

That is, according to the present invention, the honeycomb catalyst described below and manufacturing method thereof are provided.

[1] A honeycomb catalyst comprising porous partition walls having a plurality of pores, which are arranged to form a plurality of cells allowing communication between two end faces; plugging portions which are arranged to plug the cells in one of the end faces; and a catalytically active component loaded on surfaces of the partition walls and inner surfaces of the pores, wherein many catalytically active component-loading pores allowing a gas to pass therethrough are formed in the partition walls, and a ratio of a mass ($M_W$) to a mass ($M_P$) is ($M_W$):($M_P$)=1:3 to 3:1 where ($M_W$) is a mass of the catalytically active component loaded on the surfaces of the partition walls per unit volume of the partition walls, and ($M_P$) is a mass of the catalytically active component loaded on the inner surfaces of the pores per unit volume of the partition walls.

[2] The honeycomb catalyst according to the paragraph [1], wherein a mass ($M_{W1}$) of the catalytically active component loaded on one surface of the partition walls per unit volume of the partition walls is larger than a mass ($M_{W2}$) of the catalytically active component loaded on the other surface of the partition walls per unit volume of the partition walls.

[3] The honeycomb catalyst according to the paragraph [2], wherein the mass ($M_{W1}$) of the catalytically active component loaded on the one surface of the partition walls per unit volume of the partition walls and the mass ($M_{W2}$) of the catalytically active component loaded on the other surface of the partition walls per unit volume of the partition walls satisfy a relationship of ($M_{W1}$)≧1.5×($M_{W2}$).

[4] The honeycomb catalyst according to any one of the paragraphs [1] to [3], wherein the catalytically active component includes a first catalytically active component and a second catalytically active component having poisoning resistance lower than that of the first catalytically active component, and a mass of the second catalytically active component loaded on the inner surfaces of the pores per unit volume of the partition walls and/or a mass of the second catalytically active component loaded on one surface of the partition walls per unit volume of the partition walls is larger than a mass of the second catalytically active component loaded on the other surface of the partition walls per unit volume of the partition walls.

[5] The honeycomb catalyst according to any one of the paragraphs [1] to [4], wherein a hydrocarbon-based molecule adsorbent which mainly contains zeolite is further loaded on at least one surface of the partition walls.

[6] The honeycomb catalyst according to any one of the paragraphs [1] to [5], wherein the catalytically active component is at least one selected from the group consisting of a three-way catalyst for purification of an exhaust gas from a gasoline engine, an oxidation catalyst for purification of hydrocarbon, carbon monoxide, or soot, an SCR catalyst for $NO_x$ selective reduction, an $NO_x$ storage catalyst, a four-way catalyst having a three-way purifying function and a soot purifying function, and a catalyst which is used to purify oxide-based harmful components contained in a combustion exhaust gas.

[7] A manufacturing method of a honeycomb catalyst, comprising applying a first catalytic slurry containing a particulate catalytically active component whose maximum particle diameter is smaller than a maximum pore diameter of the pores to a honeycomb structure comprising porous partition walls having a plurality of pores, which are arranged to form the plurality of cells allowing communication between two end faces; and plugging portions arranged to plug the cells in one of the end faces to load the catalytically active component on inner surfaces of pores; and subsequently applying a second catalytic slurry containing the particulate catalytically active component whose minimum particle diameter is larger than the maximum pore diameter of the pores to the honeycomb structure to load the catalytically active component on surfaces of partition walls; thereby obtaining the honeycomb catalyst in which many catalytically active component-loading pores allowing a gas to pass therethrough are formed in partition walls and a ratio of a mass ($M_W$) of the catalytically active component loaded on surfaces of the partition walls per unit volume of the partition walls to a mass ($M_P$) of the catalytically active component loaded on the inner surfaces of the pores is ($M_W$):($M_P$)=1:3 to 3:1 (hereinafter referred to also as "the first manufacturing method of the honeycomb catalyst").

[8] A manufacturing method of a honeycomb catalyst, comprising applying a third catalytic slurry containing a particulate catalytically active component of a predetermined viscosity to a honeycomb structure comprising the porous partition walls having a plurality of pores, which are arranged to form the plurality of cells allowing communication between two end faces; and plugging portions arranged to plug the cells in one of the end faces to load the catalytically active component on inner surfaces of pores; and subsequently applying a fourth catalytic slurry which contains the particulate catalytically active component and has a higher viscosity than that of the third catalytic slurry to the honeycomb structure to load the catalytically active component on surfaces of partition walls, thereby obtaining the honeycomb catalyst in which many catalytically active component-loading pores allowing a gas to pass therethrough are formed in the partition walls and a ratio of a mass ($M_W$) of the catalytically active component loaded on surfaces of the partition walls per unit volume of the partition walls to a mass ($M_P$) of the catalytically active component loaded on the inner surfaces of the pores is ($M_W$):($M_P$)=1:3 to 3:1 (hereinafter referred to also as "the second manufacturing method of the honeycomb catalyst").

The honeycomb catalyst of the present invention demonstrates the effect that it is superior in the purification efficiency, has a small pressure loss, and can be mounted even in a limited space.

Further, according to the manufacturing method of a honeycomb catalyst of the present invention, it is possible to manufacture a honeycomb catalyst which is superior in the purification efficiency, has a small pressure loss, and can be mounted even in a limited space.

EXPLANATION OF LETTERS OR NUMERALS 1, 11: honeycomb catalyst, 2a, 2b: end surface, 3: cell, 4: partition wall, 5, 15: catalytically active component, 10: plugging portion, 20: outer wall, 25: pore, 30: partition wall outlet-side surface, 32: partition wall inlet-side surface, 35: catalytically active component-loading pore, 45: inside of a partition wall, D: cell hydraulic diameter, P: cell pitch, T, t: a thickness of the partition wall, and v: observation range (view field)

BEST MODE FOR CARRYING OUT THE INVENTION

Although the best mode for carrying out the present invention will now be explained hereinafter, the present invention is not restricted to the following embodiment, and it should be understood that structures obtained by appropriately modifying or improving the following embodiment based on usual knowledge of persons skilled in the art without departing from the purpose of the invention are included in the scope of the present invention. Incidentally, hereinafter, a simple description "a manufacturing method of a honeycomb catalyst of the present invention (the present embodiment)" means both a manufacturing method of a first honeycomb catalyst and a manufacturing method of a second honeycomb catalyst.

Figure 1:
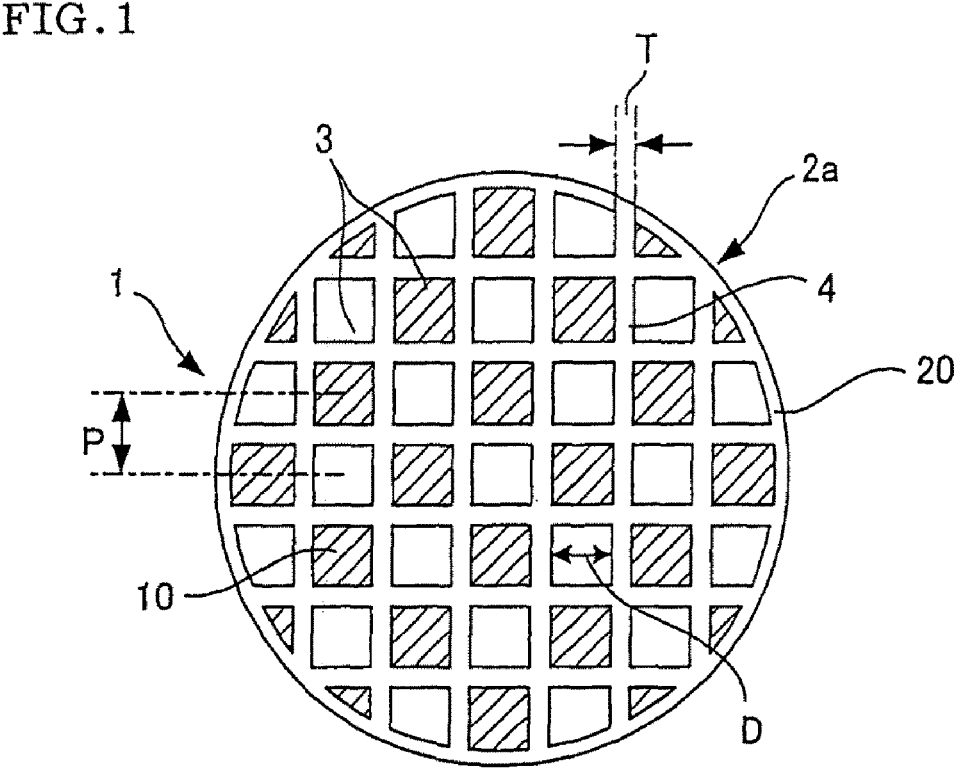
FIG. 1: a front view schematically showing an embodiment of a honeycomb catalyst of the present invention.
Figure 2:
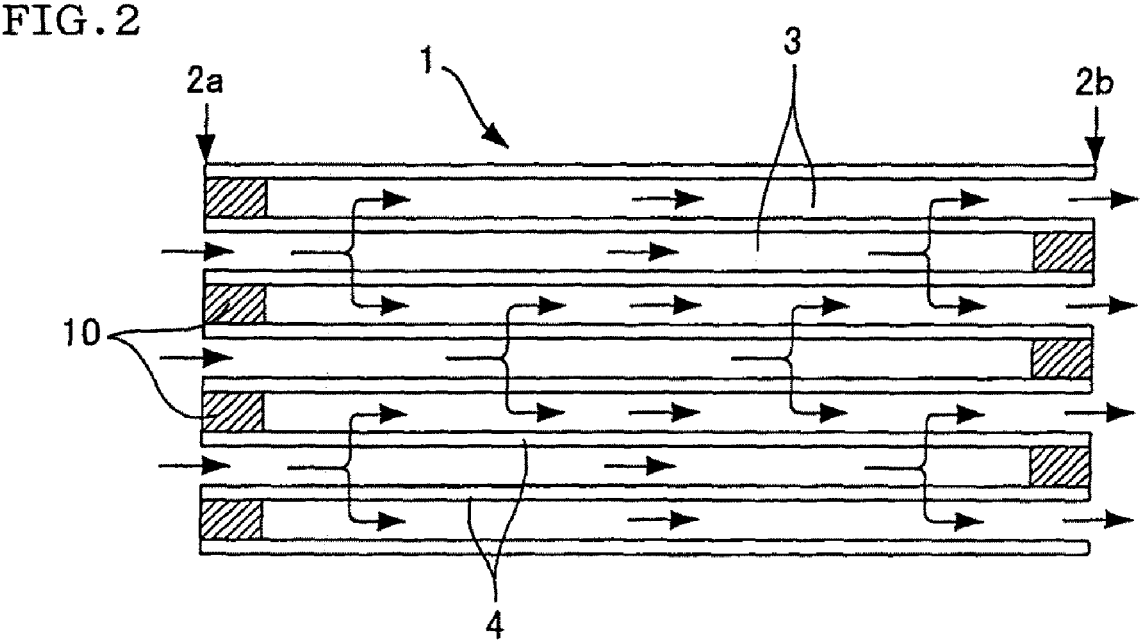
FIG. 2: a cross-sectional view showing an embodiment of the honeycomb catalyst of the present invention.
Figure 3:
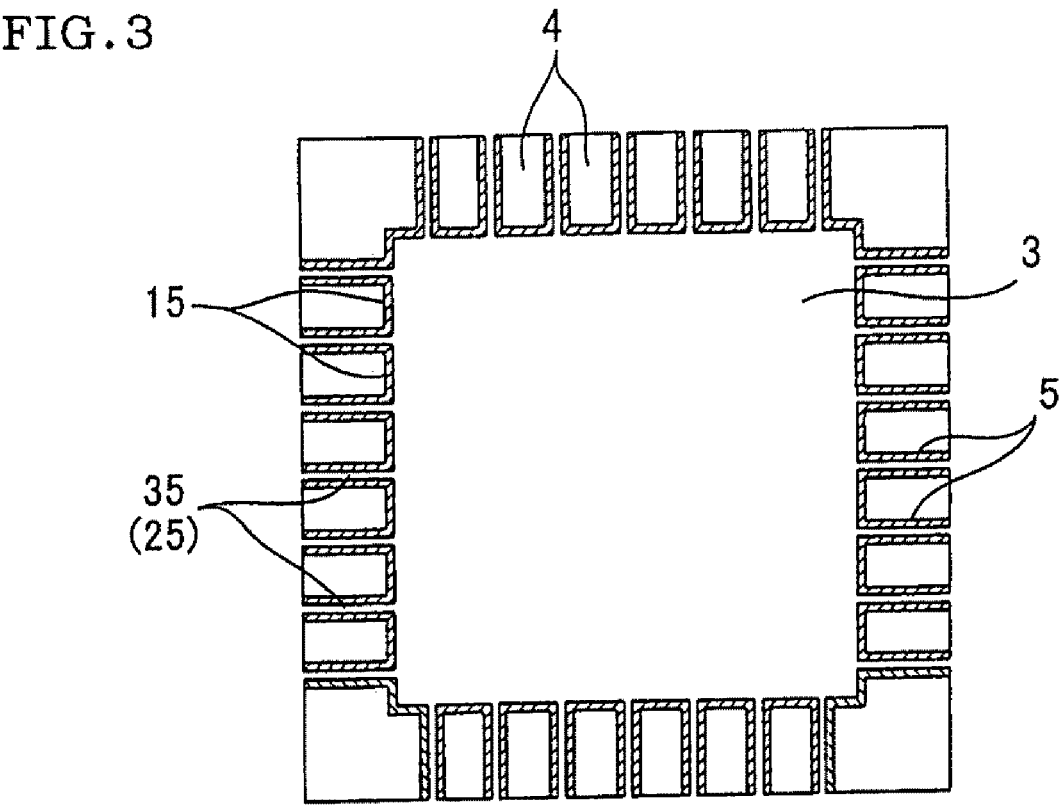
FIG. 3: a partially enlarged view schematically showing an embodiment of the honeycomb catalyst of the present invention.
Figure 4:
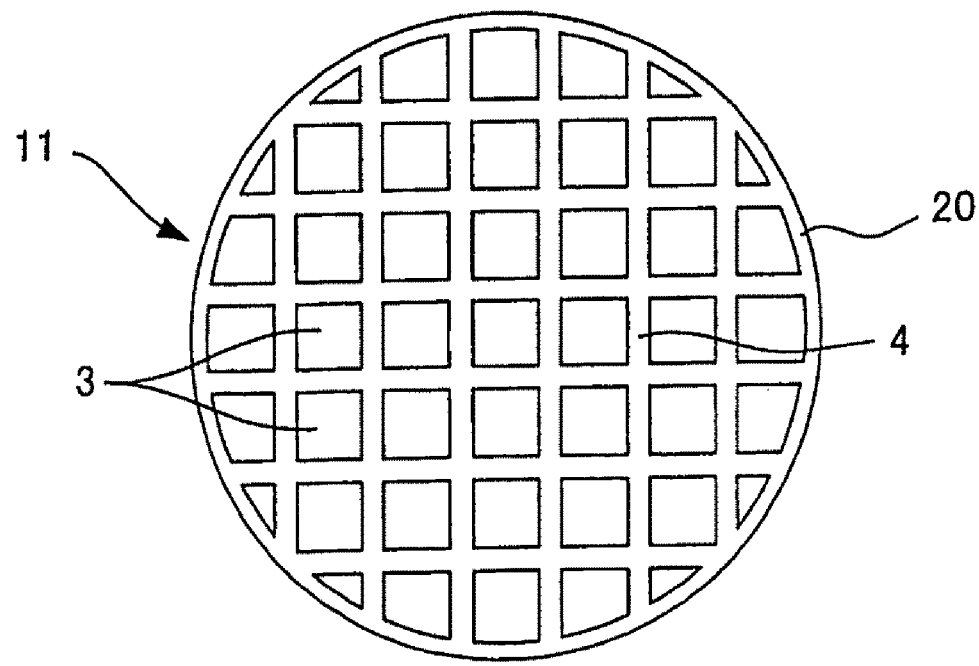
FIG. 4: a front view schematically showing an embodiment of a conventional honeycomb catalyst.
Figure 5:
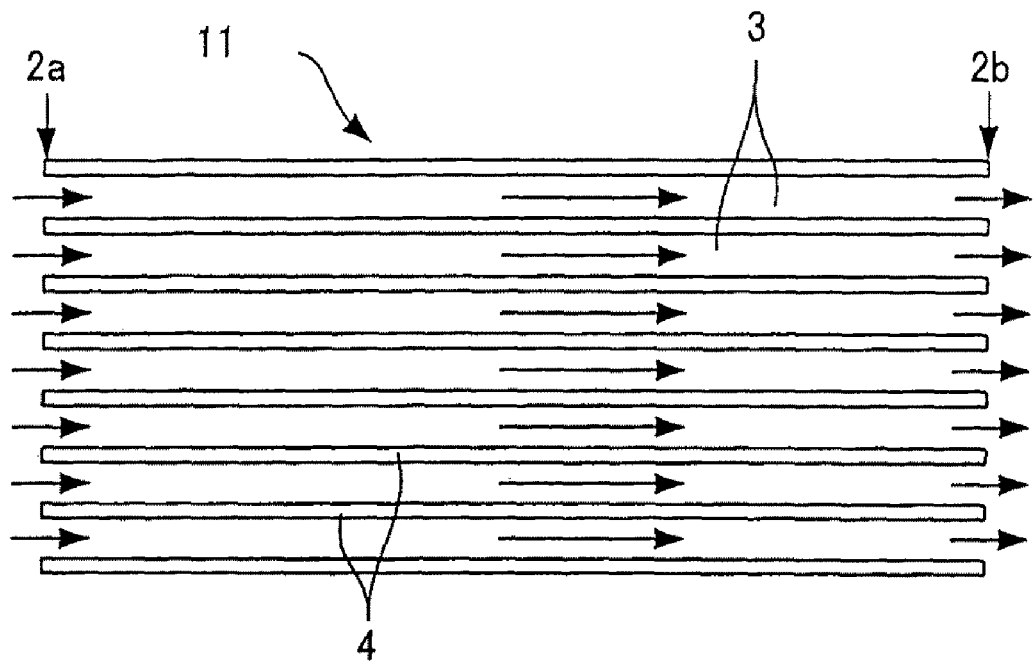
FIG. 5: a cross-sectional view schematically showing an embodiment of the conventional honeycomb catalyst.
Figure 6:
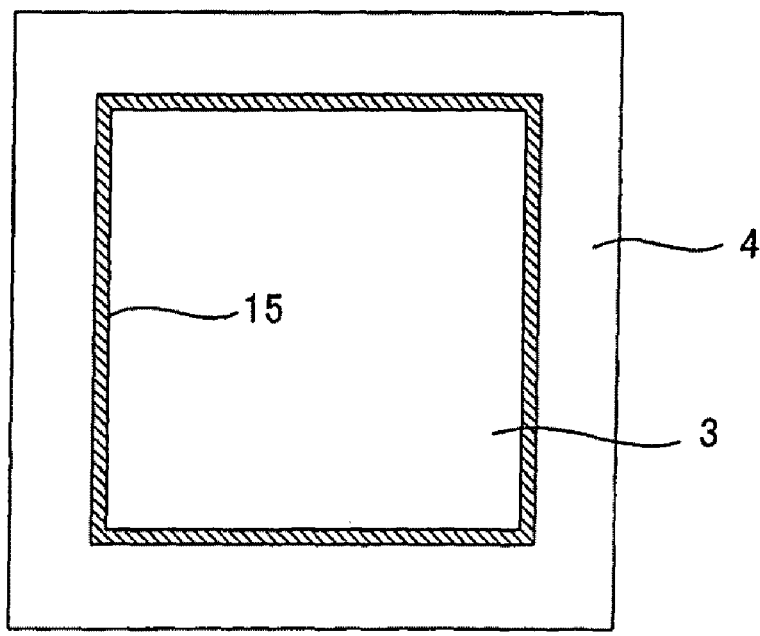
FIG. 6: a partially enlarged view schematically showing an embodiment of the conventional honeycomb catalyst.

FIG. 1 is a front view schematically showing an embodiment of a honeycomb catalyst of the present invention. Further, FIG. 2 is a cross-sectional view schematically showing the embodiment of the honeycomb catalyst of the present invention, and FIG. 3 is a partially enlarged view schematically showing the embodiment of the honeycomb catalyst according to the present invention. As shown in FIGS. 1 to 3, a honeycomb catalyst 1 of the present embodiment includes porous partition walls 4 having a plurality of pores 25, plugging portions 10, and catalytically active components 5 and 15 loaded on a surface of each partition wall 4 and an inner surface of each pore 25. The partition walls 4 are arranged to form a plurality of cells 3 allowing communication between two end faces 2a and 2b. Moreover, each plugging portion 10 is arranged to plug the cell 3 in one of the end faces 2a and 2b. The catalytically active component 5 is loaded in the form of a layer on the inner surface of each pore 25, and many catalytically active component-loading pores 35 through which a gas can pass are formed in the partition walls 4. Additionally, the catalytically active component 15 is loaded in the form of a layer on the surface of each partition wall 4. Incidentally, in FIG. 1, reference letter P denotes a cell pitch; D, a cell hydraulic diameter; and T, a thickness of the partition wall, respectively.

Easiness in transmission of unpurified components contained in an exhaust gas when the exhaust gas passes through a flow path is in inverse proportion to a square of a hydraulic diameter of the flow path. Here, a hydraulic diameter of the pore is considerably smaller than that of the cell. Therefore, comparing the catalytically active component 15 loaded on the surface of the partition wall 4 with the catalytically active component 5 loaded on the inner surface of the pore 25, the catalytically active component 5 loaded on the inner surface of the pore 25 allows more unpurified components contained in the exhaust gas to pass.

Here, in the honeycomb catalyst 1 of the present embodiment, a ratio of a mass ($M_W$) of the catalytically active component 15 loaded on the surface of the partition wall 4 per unit volume of the partition wall 4 to a mass ($M_P$) of the catalytically active component 5 loaded on the inner surface of the pore 25 per unit volume of the partition wall 4 is ($M_W$):($M_P$)=1:3 to 3:1, or preferably ($M_W$):($M_P$)=1:2 to 2:1. In the honeycomb catalyst 1 of the present embodiment having the ratio of $M_W$ and $M_P$ controlled to the above-explained range, a surface area of a limited carrier (the honeycomb structure) is effectively exploited. Accordingly, when the honeycomb catalyst 1 of the present embodiment is used as a catalyst for purification of the exhaust gas, the catalytically active per unit volume of the partition wall 4 is sufficiently brought out, thereby the excellent purification efficiency is demonstrated.

Figure 7:
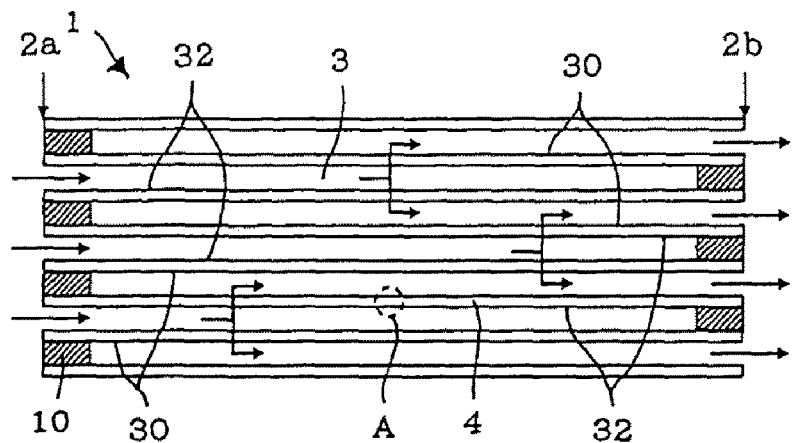
FIG. 7: a cross-sectional view for schematically explaining a partition wall outlet-side surface and a partition wall inlet-side surface.
Figure 8:
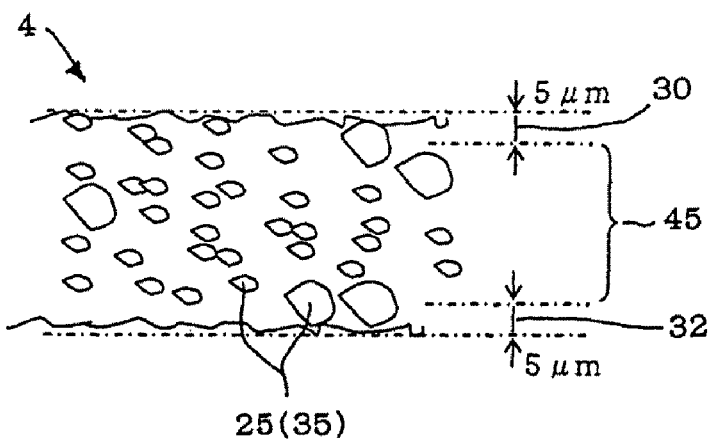
FIG. 8: an enlarged view of a part A in FIG. 7.

The "catalytically active component loaded on the surface of the partition wall" and the "catalytically active component loaded on the inner surface of the pore" written in this specification will now be explained. FIG. 7 is a cross-sectional view for schematically explaining a partition wall outlet-side surface and a partition wall inlet-side surface. Further, FIG. 8 is an enlarged view of a part A in FIG. 7. As shown in FIG. 7, assuming that a fluid is flowed in from one end surface 2a side into the cell 3 of the honeycomb catalyst 1, one of two surfaces of the partition wall 30 denoted by reference numeral 30 is the partition wall outlet-side surface. Furthermore, a surface denoted by reference numeral 32 is the partition wall inlet-side surface. Moreover, as shown in FIG. 8, a catalytically active component loaded in a thickness within the range of 5 μm from the surface of the partition wall 4 (the partition wall outlet-side surface 30 and the partition wall inlet-side surface 32) is defined as the "catalytically active component loaded on the surface of the partition wall". Additionally, a catalytically active component loaded in a thickness within the range of below 5 μm from the surface of the partition wall 4 (the inside 45 of the partition wall) is defined as the "catalytically active component loaded on the inner surface of the pore".

It is preferable for a mass ($M_{W1}$) of the catalytically active component loaded on one surface (for example, the partition wall outlet-side surface 30) of the partition wall 4 per unit volume of the partition wall 4 to be larger than a mass ($M_{W2}$) of the catalytically active component loaded on the other surface (for example, the partition wall inlet-side surface 32) of the partition wall 4 per unit volume of the partition wall (see FIG. 7). Providing a difference in catalytically active component-loading amounts between the both surfaces of the partition wall 4 in this manner can suppress degradation in the catalytically active component due to a treatment of the exhaust gas and enables use over a long period of time. More specifically, it is preferable for the mass ($M_{W1}$) of the catalytically active component loaded on one surface (e.g., the partition wall outlet-side surface 30) of the partition wall 4 per unit volume of the partition wall 4 and the mass ($M_{W2}$) of the catalytically active component loaded on the other surface (for example, the partition wall inlet-side surface 32) of the partition wall 4 per unit volume of the partition wall to satisfy a relationship ($M_{W1}$)≧2×($M_{W2}$), and more preferable to satisfy a relationship ($M_{W1}$)≧3×($M_{W2}$). A specific explanation will now be given while exemplifying usages.

At first, a case where the mass ($M_{W1}$) of the catalytically active component loaded on the partition wall outlet-side surface 30 per unit volume of the partition wall 4 is larger than the mass ($M_{W2}$) of the catalytically active component loaded on the partition wall inlet-side surface 32 per unit volume of the partition wall will be explained. In this case, the exhaust gas is flowed in from one end surface 2a side. Therefore, unpurified components contained in the exhaust gas or the like are brought into contact with (1) the catalytically active component loaded on the partition wall inlet-side surface 32 and (2) the catalytically active component loaded on the partition wall outlet-side surface 30 in the mentioned order, and then purified. Accordingly, when a great reduction in activity of the catalytically active component due to poisoning is unavoidable because, for example, an amount of the unpurified component contained in the exhaust gas is large or a metal component such as plumbum (Pb) or a poisoning material such as phosphor (P) due to an engine oil is contained in the exhaust gas, an amount of the catalytically active component loaded on the partition wall outlet-side surface 30 is large, and hence degradation in the catalytically active component hardly occurs, and use in a long period of time is possible.

At second, a case where the mass ($M_{W1}$) of the catalytically active component loaded on the partition wall inlet-side surface 32 per unit volume of the partition wall 4 is larger than the mass ($M_{W2}$) of the catalytically active component loaded on the partition wall outlet-side surface 30 per unit volume of the partition wall will be explained. In this case, likewise, the unpurified component contained in the exhaust gas or the like is brought into contact with (1) the catalytically active component loaded on the partition wall inlet-side surface 32 and (2) the catalytically active component loaded on the partition wall outlet-side surface 30 in the mentioned order, and then purified. Therefore, the unpurified component contained in the exhaust gas has a high concentration since its unpurified ratio is high on the partition wall inlet-side surface, and has a low concentration on the partition wall outlet-side surface. Accordingly, when a great reduction in activity of the catalytically active component due to poisoning hardly occurs, a large amount of the catalytic component is loaded on the partition wall inlet-side surface 30 where the unpurified component is present with a high concentration, and hence the catalyst can be effectively utilized.

Next, it is assumed that the catalytically active component includes a first catalytically active component and a second catalytically active component having lower poisoning-resisting properties than the first catalytically active component. In this case, it is preferable that a mass of the second catalytically active component loaded on the inner surface of the pore per unit volume of the partition wall 4 and/or a mass of the second catalytically active component loaded on one surface of the partition wall 4 (for example, the partition wall outlet-side surface 30) per unit volume of the partition wall 4 is larger than a mass of the second catalytically active component loaded on the other surface of the partition wall (for example, the partition wall inlet-side surface 32) per unit volume of the partition wall 4 (see FIG. 7).

An example will now be explained where the mass of the second catalytically active component loaded on the inner surface of the pore per unit volume of the partition wall 4 and/or the second catalytically active component loaded on the partition wall outlet-side surface 30 per unit volume of the partition wall 4 is larger than the mass of the second catalytically active component loaded on the partition wall inlet-side surface 32 per unit volume of the partition wall 4. In this case, the exhaust gas flows in from one end surface 2a side. Therefore, the unpurified component contained in the exhaust gas or the like is brought into contact with (1) the partition wall inlet-side surface 32, (2) the inner surface of the pore, and (3) the partition wall outlet-side surface 30 in the mentioned order, and then purified. Accordingly, when a larger amount of the second catalytically active component having the lower poisoning-resisting properties is loaded on the partition wall outlet-side surface 30, degradation in the catalytically active component hardly occurs, and use in a long period of time is possible.

Completely grading a measure of the poisoning properties described in this specification is difficult since it varies depending on a poisoning material or reaction conditions, but the following things can be said as a comparison result. That is, as the first catalytically active component, there are, for example, a Pt-based catalyst as a three-way catalyst or an oxidation catalyst, and a Ba/alumina catalyst as an $NO_x$ storage catalyst. Further, as the second catalytically active component, there are, for example, a Pd-based catalyst as a three-way catalyst or an oxidation catalyst, and a Ba/titania catalyst as an $NO_x$ storage catalyst.

Incidentally, it is preferable that an adsorbent for a hydrocarbon-based molecule which mainly contains zeolite is further loaded on at least one surface (the partition wall outlets side surface 30 and/or the partition wall inlet-side surface 32) of the partition wall (see FIG. 7). When the unpurified component is a hydrocarbon-based molecule such as hexane or toluene, using the honeycomb catalyst 1 of the present embodiment in which such an adsorbent is loaded enables adsorption of this hydrocarbon-based molecule under low-temperature conditions. Furthermore, when a temperature is increased after adsorption, the hydrocarbon-based molecule desorbed from this adsorbent is rapidly purified by the catalytically active component. Therefore, the honeycomb catalyst 1 of the present embodiment in which such an adsorbent is loaded is further superior in the purification efficiency.

As the adsorbent for the hydrocarbon-based molecule which mainly contains zeolite, there are, for example, β-type zeolite which is of a proton type or subjected to metal ion exchange, ZSM-5 type zeolite, Y type zeolite, ferrierite type zeolite.

As the catalytically active component loaded in the honeycomb catalyst 1 of the present embodiment, there is at least one selected from the group consisting of a three-way catalyst for purification of a gasoline engine exhaust gas, an oxidation catalyst for purification of hydrocarbon, carbon monoxide, or soot, an SCR catalyst for $NO_x$ selective reduction, an $NO_x$ storage catalyst, a four-way catalyst having a three-way purifying function and a soot purifying function, and a catalyst used to purify an oxide-based harmful component such as $SO_x$ in a combustion exhaust gas. Here, when a noble metal such as Pt, Rh, or Pd typified by a three-way catalyst for purification of a gasoline engine exhaust gas is the catalytically active component, a mass of the catalytically active component means a mass of the noble metal. Moreover, a mass of the catalytically active component when a component other than the noble metal (for example, an oxide component) is the catalytically active component means a total mass of the catalyst.

A density of the cells 3 (a cell density) in the honeycomb catalyst 1 of the present embodiment is preferably 0.775 to 155 pieces/$cm^2$ (5 to 1000 cpsi), more preferably 3.1 to 77.5 pieces/$cm^2$ (20 to 500 cpsi), and particularly preferably 4.65 to 46.5 pieces/$cm^2$ (30 to 300 cpsi). When the cell density is below 0.775 pieces/$cm^2$, a contact efficiency with respect to the exhaust gas tends to be insufficient. On the other hand, when the cell density exceeds 155 pieces/$cm^2$, a pressure loss tends to increase. Incidentally "cpsi" is an abbreviation of "cells per square inch" and it is a unit representing the number of cells per square inch. 10 cpsi is approximately 1.55 pieces/$cm^2$.

A thickness of the partition wall 4 (a partition wall thickness T) is preferably 0.127 to 2.54 mm (5 to 100 mil), more preferably 0.203 to 1.27 mm (8 to 50 mil), and particularly preferably 0.254 to 0.762 mm (10 to 30 mil). When the partition wall thickness T is below 0.127 mm, strength is insufficient and thermal shock resistance is reduced in some cases. On the other hand, when the partition wall thickness T exceeds 2.54 mm, a pressure loss tends to increase. Incidentally, 1 mil is $\frac{1}{1000}$ inch and it is 0.0254 mm.

An average pore diameter of the partition wall 4 in a state where the catalytically active component 5 is loaded, that is, a state where catalytically active component-loading pores 35 are formed, is preferably 20 to 3000 μm, and more preferably 30 to 500 μm. When the average pore diameter is below 20 μm, fine particles such as carbon fine particles contained in the exhaust gas discharged from, for example, a diesel engine are apt to be captured, and a pressure loss tends to increase. On the other hand, when the average pore diameter exceeds 3000 μm, a sufficient contact area of the exhaust gas and the catalytic layer tends to be hardly assured. Incidentally the "pore diameter" described in this specification is a physical property measured based on image analysis. Specifically, when the partition wall thickness is determined as "t", at least 20 view fields in an SEM photograph of a partition wall cross section each having a size of a length×a breadth=t×t are observed. Then, in the respective observed view fields, a maximum linear distance in each void is measured, and an average value of the maximum linear distances measured with respect to all the view fields is determined as the "average pore diameter".

Figure 9:
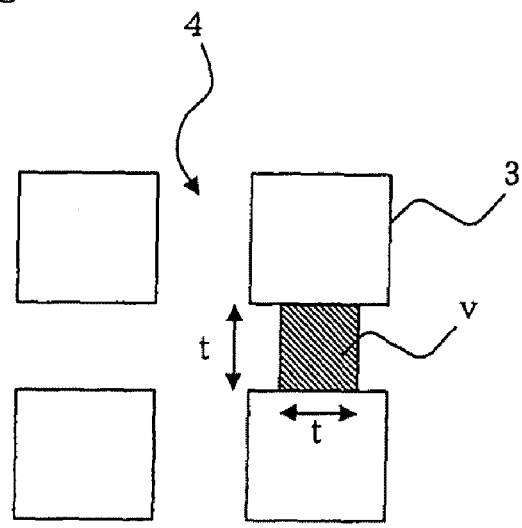
FIG. 9: a plan view schematically showing a state where an end surface of the embodiment of the honeycomb catalyst of the present invention is partially enlarged.
Figure 10:
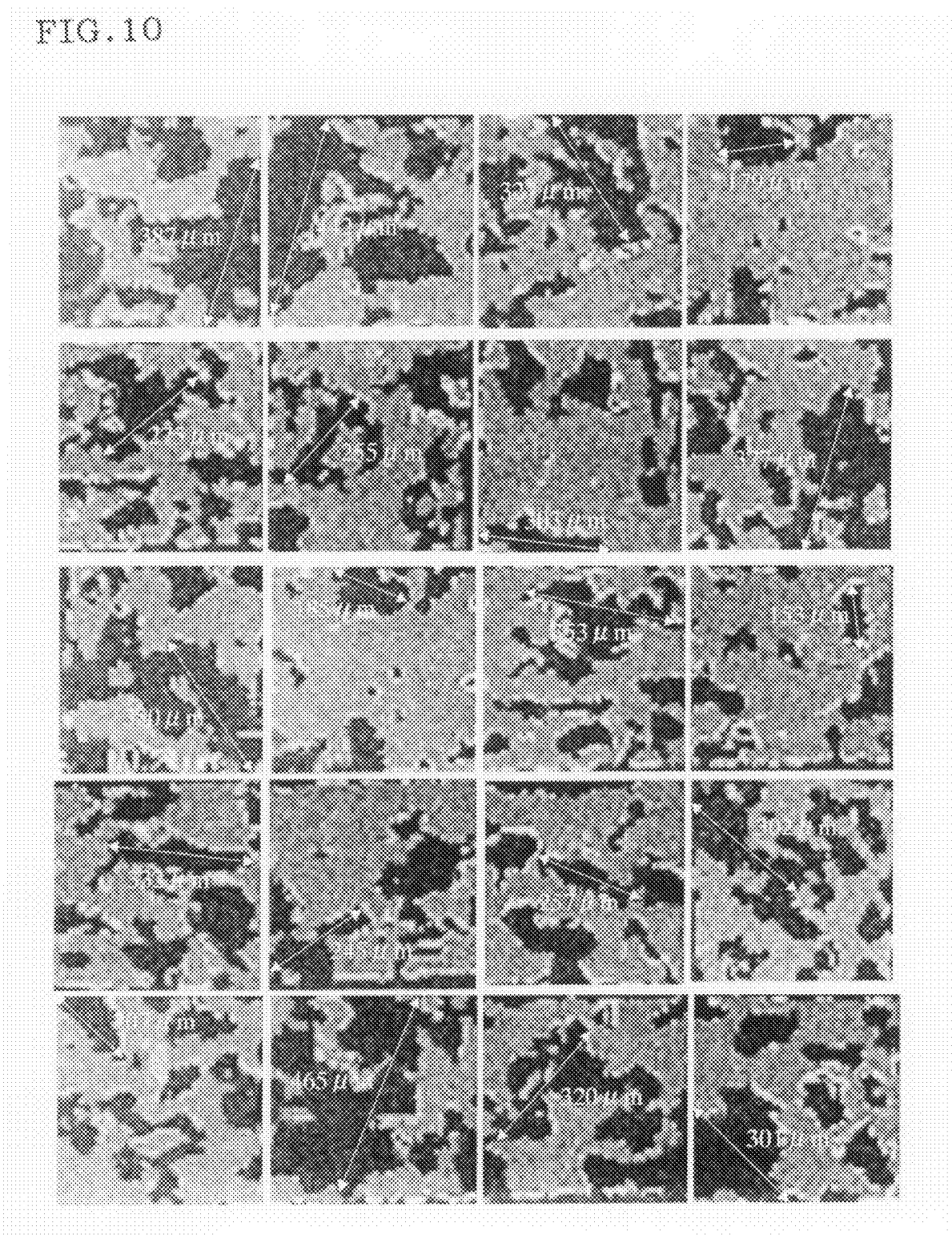
FIG. 10: SEM photographs of an embodiment of the honeycomb catalyst of the present invention.

For example, in a plan view of FIG. 9 where the end surface of the honeycomb catalyst is partially enlarged, a range of t×t of the partition wall 4 is determined as one observation range (a view field) v, SEM photographs of 20 view fields are taken, and images are analyzed. Additionally, as shown in FIG. 10, maximum linear distances in the respective 20 view fields of the SEM photographs are measured, and an average value is obtained. In the SEM photographs of the 20 view fields shown in FIG. 10, the respective maximum linear distances are 387 µm, 442 µm, 327 µm, 179 µm, 275 µm, 255 µm, 303 µm, 377 µm, 350 µm, 185 µm, 353 µm, 153 µm, 332 µm, 245 µm, 257 µm, 302 µm, 207 µm, 465 µm, 320 µm, and 301 µm from a left end toward a right end on the uppermost column and from an upper column to a lower column. In this case, an image maximum distance average is 301 µm.

Incidentally, the SEM photographs shown in FIG. 10 are taken with a scaling factor of ×50. Commercially available image analysis software can be used for image analysis, and software having a product name of Paint Shop ProX manufactured by COREL Corporation can be utilized, for example. As a scaling factor of the SEM photographs, a scaling factor which enables acquisition of a clear image can suffice, and it is good enough to select an arbitrary scaling factor of ×10 to ×1000.

A porosity of the partition wall 4 in a state where the catalytically active component 5 is loaded, that is, a state where each catalytically active component-loading pores 35 are formed, is preferably 40% or above. Incidentally the "porosity" described in this specification means a physical property measured based on image analysis. Specifically, at least five view fields of SEM photographs showing the partition wall cross section are observed, each view field having a size of a length×a breadth=t×t where "t" is a partition wall thickness. Void area ratios in the respective observed view fields are obtained, and an average in all the view fields of values obtained by raising the void area ratios to the three-halves power is determined as the "porosity".

A common logarithm standard deviation (a pore diameter distribution σ) of a pore diameter distribution of the partition wall 4 is preferably 0.1 to 0.6, and more preferably 0.2 to 0.6. When the pore diameter distribution is below 0.1, a partition wall passing flow rate tends to increase and the purification performance tends to deteriorate. On the other hand, when the pore diameter distribution σ exceeds 0.6, the gas flows into large pores only, and hence the purification performance tends to deteriorate.

The porosity of the plugging portions 10 in the honeycomb catalyst 1 of the present embodiment is preferably 40% or above, more preferably 40 to 70%, and particularly preferably 40 to 65%. When the porosity of the plugging portions 10 is set to 40% or above, a calorific capacity can be reduced, and a time required for the catalyst to reach an activity temperature can be shortened. Therefore, the purification performance in this period of time can be improved.

Further, it is preferable for a cross-sectional shape obtained by radially cutting the honeycomb catalyst 1 of the present embodiment along a surface vertical to a communicating direction of each cell to be a shape suitable for an inner shape of an exhaust system which is to be disposed. Specifically, there is a circle, an ellipse, an oval, a trapezoid, a triangle, a square, a hexagon, or an irregular shape asymmetrical in the lateral direction. Among them, the circle, the ellipse, or the oval is preferable.

Next, the first manufacturing method of the honeycomb catalyst of the present invention will be explained. The honeycomb catalyst 1 of the present embodiment can be manufactured by applying a first catalytic slurry containing a particulate catalytically active component whose maximum particle diameter is smaller than a maximum pore diameter of each pore to a honeycomb structure having a predetermined shape, loading the catalytically active component on the inner surface of each pore, then applying a second catalytic slurry containing a particulate catalytically active component whose minimum particle diameter is larger than the maximum pore diameter of each pore, and loading the catalytically active component on the surface of each partition wall. The particulars of this method will be explained below.

As shown in FIGS. 1 and 2, the honeycomb structure serving as a catalyst loader has the porous partition walls 4 having a plurality of pores, which are arranged to form a plurality of cells allowing communication between the two end faces 2a and 2b, and plugging portions 10 arranged to plug the cells 3 on one of the end faces 2a and 2b. As a material constituting the honeycomb structure, there is a material mainly containing ceramics or a sintered metal as a preferred example. Furthermore, when the honeycomb structure is formed of a material mainly containing ceramics, as a preferred example of the ceramics, there is, for example, silicon carbide, cordierite, alumina titanate, sialon, mullite, silicon nitride, zirconium phosphate, zirconia, titania, alumina, silica, or a combination of these materials. In particular, the ceramics such as silicon carbide, cordierite, mullite, silicon nitride, or alumina is preferable in terms of alkali-resistant properties. Among others, the oxide-based ceramics is preferable in light of a cost.

A thermal expansion coefficient of the honeycomb structure in the cell communicating direction at 40 to 800° C. is preferably below $1.0 \times 10^{-6}/°$ C., more preferably 0 to $0.8 \times 10^{-6}/°$ C., and particularly preferably 0 to $0.5 \times 10^{-6}/°$ C. When the thermal expansion coefficient in the cell communicating direction at 40 to 800° C. is below $1.0 \times 10^{-6}/°$C., a thermal stress under exposure to the high-temperature exhaust gas can be suppressed, thereby destruction due to the thermal stress can be avoided.

The honeycomb structure can be manufactured in accordance with a manufacturing method conforming to a conventionally known diesel particulate filter (DPF) manufacturing method. However, the honeycomb catalyst of the present invention in which the catalytically active component is loaded on the honeycomb structure has the partition walls in which many catalytically active component-loading pores through which a gas can pass are formed. Therefore, the pore structure in the partition walls can be adjusted by, for example, appropriately adjusting a chemical composition of a material or appropriately adjusting a type, a particle diameter, an additive amount, or the like of a pore former when the pore former is used to form a porous structure.

The catalytic slurry can be prepared in accordance with a conventionally known method. However, in the first manufacturing method of the honeycomb structure of the present embodiment, the first catalytic slurry and the second catalytic slurry in which particle diameters of the contained particulate catalytically active components are controlled are prepared. The first catalytic slurry contains the particulate catalytically active component whose maximum particle diameter is smaller than the maximum pore diameter of the pores. Moreover, the second catalytic slurry contains the particulate catalytically active component whose minimum particle diameter is larger than the maximum pore diameter of the pores.

According to the first manufacturing method of the honeycomb catalyst of the present embodiment, first, the first catalytic slurry is applied to the honeycomb structure to load the catalytically active component on the inner surface of each pore. Then, the second catalytic slurry is applied to load the catalytically active component on the surface of each partition wall. When applying each catalytic slurry, it is good enough to, for example, flow or immerse the catalytic slurry in each cell from one end side of the honeycomb structure based on a method such as a suction method. Also, in order to load the catalytically active component on the inner surface of each pore, it is good enough to, for example, apply each catalytic slurry, then remove the excessive catalytic slurry, and perform drying.

The maximum particle diameter of the catalytically active component contained in the first catalytic slurry is smaller than the maximum pore diameter of the pores. Therefore, the first catalytic slurry can readily enter and pass through each pore, and hence the catalytically active component can be efficiently loaded on the inner surface of each pore. Incidentally, the "maximum particle diameter" described in this specification means a particle diameter of each particle which corresponds to 95% of positions of all particles when a particle size distribution of the catalytically active component is organized in the form of a quantity distribution (a histogram in which an abscissa axis represents a particle diameter and an ordinate axis represents the number of particles in regard to the particle diameter) and the number of particles is counted from a smaller particle diameter.

Further, the minimum particle diameter of the catalytically active component contained in the second catalytic slurry is larger than the maximum pore diameter of the pores. Therefore, the second catalytic slurry hardly enters each pore, and the catalytically active component can be efficiently loaded on the surface of each partition wall. Incidentally, the "minimum particle diameter" described in this specification means a particle diameter of each particle which corresponds to 5% of positions of all particles when a granularity distribution of the catalytically active component is organized in the form of a quantity distribution (a histogram in which an abscissa represents a particle diameter and an ordinate represents the number of particles in regard to the particle diameter) and the number of particles is counted from a smaller particle diameter.

By using the first catalytic slurry and the second catalytic slurry in which particle diameters of the contained particulate catalytically active components are controlled, a loading amount of the catalytically active component at each part in the honeycomb catalyst can be exactly controlled.

Incidentally, the second catalytic slurry can be applied on two or more stages. That is, the catalytic slurry is, for example, flowed or immersed in each cell from one end side of the honeycomb structure (the first stage), and then the catalytic slurry is, for example, flowed or immersed in each cell from one end side of the honeycomb structure (the second stage and subsequent stages). As a result, different types of catalytically active components can be respectively loaded on both surfaces of the partition wall, or loading amounts of the catalytically active components on both surfaces of the partition wall can be changed.

Next, the second manufacturing method of the honeycomb catalyst of the present invention will be explained. The honeycomb catalyst 1 of the present embodiment can be manufactured by applying a third catalytic slurry which contains a particulate catalytically active component and has a predetermined viscosity to the honeycomb structure having a predetermined shape, loading the catalytically active component on the inner surface of each pore, then applying a fourth catalytic slurry which contains a particulate catalytically active component and has a higher viscosity than the third catalytic slurry, and loading the catalytically active component on the surface of the partition wall. The particulars of this method will be explained below.

The honeycomb structure serving as a catalyst carrier is the same as that explained in the first manufacturing method of the honeycomb catalyst. However, according to the second manufacturing method of the honeycomb catalyst of the present embodiment, the third catalytic slurry and the fourth catalytic slurry having different viscosities are prepared. The fourth catalytic slurry has a higher viscosity than the third catalytic slurry.

According to the second manufacturing method of the honeycomb catalyst of the present embodiment, first, the third catalytic slurry is applied to load the catalytically active component on the inner surface of each pore. Then, the fourth catalytic slurry is applied to load the catalytically active component on the surface of the partition wall. When applying each catalytic slurry, it is good enough to, for example, flow or immerse the catalytic slurry in each cell from one end side of the honeycomb structure based on a method, such as, a suction method. Furthermore, in order to load the catalytically active component on the inner surface of each pore, it is good enough to, for example, apply the catalytic slurry, then remove the excessive catalytic slurry, and perform drying.

A viscosity of the third catalytic slurry is lower than that of the fourth catalytic slurry. More specifically, the viscosity of the third catalytic slurry is preferably 0.0125 mPa·s and more preferably 0.1 to 25 mPa·s. Therefore, the third catalytic slurry can readily enter and pass through each pore, and the catalytically active component can be efficiently loaded on the inner surface of each pore.

Moreover, a viscosity of the fourth catalytic slurry is higher than that of the third catalytic slurry. More specifically, it is preferable for the viscosity of the fourth catalytic slurry to be higher than that of the third catalytic slurry by 1 mPa·s or above, and more preferable for the viscosity of the fourth catalytic slurry to be higher than the same by 3 to 10 mPa·s. Therefore, the fourth catalytic slurry is difficult to enter each pore, and the catalytically active component can be efficiently loaded on the surface of each partition wall.

By using the third catalytic slurry and the fourth catalytic slurry having the adjusted viscosities in this manner, a loading amount of the catalytically active component at each part in the honeycomb structure can be exactly controlled.

Incidentally, the fourth catalytic slurry can be applied on two or more stages. That is, the catalytic slurry is, for example, flowed or immersed in each cell from one end side of the honeycomb structure (the first stage), and then the catalytic slurry is, for example, flowed or immersed in each cell from one end side of the honeycomb structure (the second stage and subsequent stages). As a result, different types of catalytically active components can be respectively loaded on both surfaces of the partition wall, or the loading amounts of catalytically active components on both surfaces of the partition wall can be changed.

EXAMPLES

Although the present invention will be specifically explained below based on examples, the present invention is not restricted to these examples. Incidentally, a measurement method for various physical properties and an evaluation method for various characteristics are described below.

[Pore Diameter]: A maximum pore diameter and a minimum pore diameter were measured based on image analysis, and an average pore diameter was calculated. Specifically, at least 20 view fields of SEM photographs each showing a partition wall cross section are observed, each view field having a size of a length×a breadth=t×t where "t" is a partition wall thickness. Then, a maximum linear distance in each void in each observed view field was measured, and an average value of the maximum linear distances measured in relation to all the view fields was determined as an "average pore diameter".

[Porosity]: Measurement was carried out based on image analysis. Specifically, at least five view fields of SEM photographs each showing a partition wall cross section was observed, each view field having a size of a length×a breadth=t×t where "t" is a partition wall thickness. A void area ratio in each observed view field was obtained, and an average in all the view fields of values obtained by raising the void area ratios to the three-halves power was determined as a "porosity".

[Catalytically active component-loading Amount]: A loading amount (a mass per unit volume of the partition wall) of each of (1) a noble metal, (2) an oxide component, copper ion exchange type zeolite, and β-type zeolite was measured in accordance with the following method.

(1) Noble metal: The honeycomb catalyst was radially cut along a surface vertical to the cell communicating direction, and its cross section was subjected to elemental analysis to perform measurement.

(2) Oxide component, copper ion exchange type zeolite, and β-type zeolite: The honeycomb catalyst was radially cut along a surface vertical to the cell communicating direction, and its cross section was subjected to image analysis to perform measurement.

[Purification Ratio]: A purification ratio was measured under the following measurement conditions (1) to (4).

Measurement condition (1): A model gas containing $CO_2$=14 volume %, $O_2$=0.4 volume %, CO=0.5 volume %, NO=1000 ppm, $C_3H_6$=500 (the number of carbon moles) ppm, $H_2O$=10 volume %, and $N_2$ as the remnant was flowed into the honeycomb catalyst under the condition of a spatial velocity (SV) 50,000 to 100,000 $h^{-1}$ and a temperature 300° C. A purification ratio (%) was calculated from concentrations of propylene ($C_3H_6$) in the exhaust gas before and after inflow.

Measurement condition (2): An exhaust gas obtained by adding 50 ppm of $SO_2$ to the exhaust gas used under the measurement condition (1) based on external distribution was flowed into the honeycomb catalyst under the same condition as the measurement condition (1). A purification ratio (%) was calculated from concentrations of propylene in the model gas before and after inflow.

Measurement condition (3): An exhaust gas containing $CO_2$=10 volume %, $O_2$=7 volume %, $NO_x$=1000 ppm, $NH_3$=1000 ppm, $C_3H_6$=500 (the number of carbon moles) ppm, $H_2O$=10 volume %, and $N_2$ as the remnant was flowed into the honeycomb catalyst under the condition of a spatial velocity (SV) 50000 $h^{-1}$ and a temperature 300° C. A purification ratio (%) was calculated from concentrations of $NO_x$ in the model gas before and after inflow.

Measurement condition (4): A model gas containing $CO_2$=14 volume %, $O_2$=0.4 volume %, CO=0.5 volume %, NO=1000 ppm, $C_3H_6$=500 (the number of carbon moles) ppm, $H_2O$=10 volume %, and $N_2$ as the remnant was flowed into the honeycomb catalyst while increasing a temperature of the exhaust gas from a room temperature to 400° C. with a temperature-up speed of 50° C./min. A purification ratio (%) was calculated from concentrations of toluene in the exhaust gas before and after inflow.

[Pressure Loss Judgment]: Air was circulated in the honeycomb catalyst under the condition of a room temperature at a flow rate of 0.5 $m^3$/min to measure a pressure loss ($P_2$). Further, a pressure loss ($P_1$) was likewise measured with respect to the honeycomb structure before loading the catalyst which has the same shape, the same cell density, and the same partition wall thickness. A "pressure loss increasing rate (%)" was calculated from the measured pressure losses $P_1$ and $P_2$ in accordance with the following Expression (1). A case where the pressure loss increasing rate is below 50% was represented as "O", and a case where the same is equal to or above 50% was represented as "x".

$$\text{Pressure loss increasing rate (\%)} = \{(P_2 - P_1)/P_1\} \times 100 \quad (1)$$

Examples 1 to 3

Comparative Examples 1 and 2

A honeycomb structure (a partition wall thickness: 17 mil, a cell density: 100 cpsi, a porosity: 52%, an average pore diameter: 43 μm, a maximum pore diameter: 82 μm, a minimum pore diameter: 15 μm, a plugging depth: 10 mm) having a diameter of 144 mm and an entire length of 152 mm was prepared. On the other hand, 70 parts by mass of an active alumina, 20 parts by mass of ceria, 10 parts by mass of zirconia, a noble metal component (a dinitrodiammine platinum nitric acid and/or rhodium nitrate), and water were mixed, and then wet milling was carried out to prepare a catalytic slurry (a liquid A). Further, a catalytic slurry (a liquid B-1) and a catalytic slurry (a liquid B-2) were prepared by the same operation. Table 1 shows a maximum particle diameter (a particle diameter corresponding to 95% in a quantity distribution) of a solid content (a catalytically active component) contained in the catalytic slurry (the liquid A) and minimum particle diameters (particle diameters corresponding to 5% in quantity distributions) of solid contents (catalytically active components) contained in the catalytic slurry (the liquid B-1) and the catalytic slurry (the liquid B-2). Incidentally, viscosities of all the catalytic slurries were equal to or below 5 mPa·s.

The catalytic slurry (the liquid A) was flowed in from one end surface side (an inlet side) by a suction method to be applied to the prepared honeycomb structure, and heating and drying were carried out to obtain a first intermediate. Then, the catalytic slurry (the liquid B-1) was flowed in from the one end surface side (the inlet side) by the suction method to be applied to the obtained first intermediate, and heating and drying were carried out to acquire a second intermediate. Subsequently, the catalytic slurry (the liquid B-2) was flowed in from the other end surface side (an outlet side) by the suction method to be applied to the obtained second intermediate, and heating and drying were performed to acquire a honeycomb catalyst (Examples 1 to 3, Comparative Examples 1 and 2). Table 1 shows catalytically active component-loading amounts on the partition wall inlet-side surface, the pore inner surface, and the partition wall outlet-side surface. Incidentally, the catalytically active-loading amount at each portion was controlled by adjusting a catalytically active component concentration of each employed catalytic slurry.

TABLE 1

| | Catalytic slurry | | | Catalytically active component-loading amount (g/L) | | | | | |
|---|---|---|---|---|---|---|---|---|---|
| | Maximum particle diameter of liquid A (μm) | Minimum particle diameter of liquid B-1 (μm) | Minimum particle diameter of liquid B-2 (μm) | Partition wall inlet-side surface | | Pore inner surface | | Partition wall outlet-side surface | |
| | | | | Oxide component | Noble metal | Oxide component | Noble metal | Oxide component | Noble metal |
| Example 1 | 35 | 102 | 98 | 40 | 0.2 (Pt) | 70 | 0.5 (Pt) | 30 | 0.4 (Pt) |
| Example 2 | 52 | 150 | 125 | 10 | 0.05 (Pt) | 30 | 0.3 (Pt) | 80 | 0.7 (Pt), 0.1 (Pt) |
| Example 3 | 5 | 96 | 85 | 10 | 0.1 (Pt) | 100 | 1.2 (Pt) | 30 | 0.3 (Pt) |
| Comparative Example 1 | 102 | 96 | 96 | 50 | 0.5 (Pt) | 0.5 | <0.01 (Pt) | 50 | 0.5 (Pt) |
| Comparative Example 2 | 35 | 5 | 5 | 2 | 0.02 (Pt) | 250 | 2.2 (Pt) | 3 | 0.04 (Pt) |

Examples 4 and 5

Comparative Example 3

A honeycomb structure (a partition wall thickness: 20 mil, a cell density: 200 cpsi, a porosity: 45%, an average pore diameter: 32 μm, a maximum pore diameter: 62 μm, a minimum pore diameter: 10 μm, a plugging depth: 5 mm) having a diameter of 118 mm and an entire length of 152 mm was prepared. On the other hand, 70 parts by mass of an active alumina, 20 parts by mass of ceria, 10 parts by mass of zirconia, a noble metal component (a dinitrodiammine platinum nitric acid or palladium nitrate), and water were mixed, and then wet milling was carried out to prepare a catalytic slurry (a liquid A). Further, a catalytic slurry (a liquid B-1) and a catalytic slurry (a liquid B-2) were prepared by the same operation. Table 2 shows viscosities of the catalytic slurry (the liquid A), the catalytic slurry (the liquid B-1), and the catalytic slurry (the liquid B-2). Incidentally, maximum particle diameters (particle diameters corresponding to 95% in a quantity distribution) of solid contents (catalytically active components) contained in the catalytic slurry (the liquid A) were all equal to or below 30 μm. Furthermore, maximum particle diameters (particle diameters corresponding to 95% in the quantity distribution) of solid contents (catalytically active components) contained in the catalytic slurry (the liquid B-1) and the catalytic slurry (the liquid B-2) were all equal to or below 40 μm.

The catalytic slurry (the liquid A) was flowed in from one end surface side (the inlet side) by a suction method to be applied to the prepared honeycomb structure, and heating and drying were carried out to obtain a first intermediate. Then, the catalytic slurry (the liquid B-1) was flowed in from the one end surface side (the inlet side) by the suction method to be applied to the obtained first intermediate, and heating and drying were carried out to acquire a second intermediate. Subsequently, the catalytic slurry (the liquid B-2) was flowed in from the other end surface side (the outlet side) by the suction method to be applied to the obtained second intermediate, and heating and drying were performed to acquire a honeycomb catalyst (Examples 4 and 5, Comparative Example 3). Table 2 shows catalytically active component-loading amounts on the partition wall inlet-side surface, the pore inner surface, and the partition wall outlet-side surface. Incidentally, the catalytically active-loading amount at each portion was controlled by adjusting a catalytically active component concentration of each employed catalytic slurry.

TABLE 2

| | Viscosity of catalytic slurry | | | catalytically active component-loading amount (g/L) | | | | | |
|---|---|---|---|---|---|---|---|---|---|
| | (mPa·s) | | | Partition wall inlet-side surface | | Pore inner surface | | Partition wall outlet-side surface | |
| | Liquid A | Liquid B-1 | Liquid B-2 | Oxide component | Noble metal | Oxide component | Noble metal | Oxide component | Noble metal |
| Example 4 | 1 | 30 | 30 | 60 | 0.6 (Pt) | 140 | 1.5 (Pt) | 30 | 0.4 (Pt) |
| Example 5 | 25 | 35 | 70 | 80 | 0.9 (Pt) | 70 | 0.5 (Pt) | 50 | 0.3 (Pt) |
| Comparative Example 3 | 70 | 70 | 70 | 50 | 0.5 (Pt) | 10 | 0.1 (Pt) | 90 | 0.8 (Pt) |

Example 6

A honeycomb structure (a partition wall thickness: 12 mil, a cell density: 300 cpsi, a porosity: 55%, an average pore diameter: 78 μm, a maximum pore diameter: 102 μm, a minimum pore diameter: 21 μm, a plugging depth: 8 mm) having a diameter of 144 mm and an entire length of 152 mm was prepared. On the other hand, 70 parts by mass of an active alumina, 20 parts by mass of ceria, 10 parts by mass of zirconia, a noble metal component (a dinitrodiammine platinum nitric acid), and water were mixed, and then wet milling was carried out to prepare a catalytic slurry. A maximum particle diameter (a particle diameter corresponding to 95% in a quantity distribution) of a solid content contained in the prepared catalytic slurry was 40 μm, and a minimum particle diameter (a particle diameter corresponding to 5% in the quantity distribution) of the same was 2 μm. Moreover, a viscosity of the catalytic slurry was equal to or below 15 mPa·s.

The catalytic slurry was flowed in from one end surface side (the outlet side) by the suction method to be applied to the prepared honeycomb structure, and heating and drying were carried out to obtain a honeycomb catalyst (Example 6). Table 3 shows catalytically active component-loading amounts on the partition wall inlet-side surface, the pore inner surface, and the partition wall outlet-side surface. Incidentally, the catalytically active component-loading amount on the partition wall outlet-side surface was larger than the catalytically active component-loading amount on the partition wall inlet-side surface since the catalytic slurry was flowed in from the outlet side of the honeycomb structure.

Example 7

A honeycomb structure (a partition wall thickness: 12 mil, a cell density: 300 cpsi, a porosity: 55%, an average pore diameter: 78 μm, a maximum pore diameter: 102 μm, a minimum pore diameter: 21 μm, a plugging depth: 8 mm) having a diameter of 144 mm and an entire length of 152 mm was prepared. On the other hand, copper exchange type zeolite was mixed with water, and then wet milling was performed to prepare a catalytic slurry. A solid content (a catalytically active component) contained in the prepared catalytic slurry had a maximum particle diameter (a particle diameter corresponding to 95% in a quantity distribution) of 10 μm and a minimum particle diameter (a particle diameter corresponding to 5% in the quantity distribution) of 2 μm. Further, a viscosity of the catalytic slurry was equal to or below 15 mPa·s.

The catalytic slurry was flowed in from one end surface side (the outlet side) by the suction method to be applied to the prepared honeycomb structure, and heating and drying were carried out to obtain a honeycomb catalyst (Example 7). Table 3 shows catalytically active component-loading amounts on the partition wall inlet-side surface, the pore inner surface, and the partition wall outlet-side surface. Incidentally, the catalytically active component-loading amount on the partition wall outlet-side surface was larger than the catalytically active component-loading amount on the partition wall inlet-side surface since the catalytic slurry was flowed in from the outlet side of the honeycomb structure.

Example 8

An adsorbent slurry containing β-type zeolite was prepared. The adsorbent slurry was flowed in from the other end surface side (the inlet side) of the honeycomb catalyst of Example 6 to apply the adsorbent slurry to the partition wall inlet-side surface. The excessive adsorbent slurry was removed, and then heating and drying were carried out to obtain a honeycomb catalyst (Example 8). Table 3 shows loading amounts of various components (a catalytically active component, the adsorbent) on the partition wall inlet-side surface, the pore inner surface, and the partition wall outlet-side surface.

Example 9

A honeycomb structure (a partition wall thickness: 12 mil, a cell density: 300 cpsi, a porosity: 55%, an average pore diameter: 278 μm, a maximum pore diameter: 402 μm, a minimum pore diameter: 151 μm, a plugging depth: 8 mm) having a diameter of 144 mm and an entire length of 152 mm was prepared. On the other hand, 70 parts by mass of an active alumina, 20 parts by mass of ceria, 10 parts by mass of zirconia, a noble metal component (a dinitrodiammine platinum nitric acid), and water were mixed, and then wet milling was performed like Example 6 to prepare a catalytic slurry. A solid content (a catalytically active component) contained in the prepared catalytic slurry had a maximum particle diameter (a particle diameter corresponding to 95% in a quantity distribution) of 40 μm and a minimum particle diameter (a particle diameter corresponding to 5% in the quantity distribution) of 2 μm. Further, a viscosity of the catalytic slurry was equal to or below 15 mPa·s.

The catalytic slurry was flowed in from one end surface side (the outlet side) by the suction method to be applied to the prepared honeycomb structure, and heating and drying were carried out to obtain a honeycomb catalyst (Example 9). Table 3 shows catalytically active component-loading amounts on the partition wall inlet-side surface, the pore inner surface, and the partition wall outlet-side surface. Incidentally, the catalytically active component-loading amount on the partition wall outlet-side surface was larger than the catalytically active component-loading amount on the partition wall inlet-side surface since the catalytic slurry was flowed in from the outlet side of the honeycomb structure like Example 6.

Example 10

A honeycomb structure (a partition wall thickness: 12 mil, a cell density: 300 cpsi, a porosity: 61%, an average pore diameter: 320 μm, a maximum pore diameter: 456 μm, a minimum pore diameter: 221 μm, a plugging depth: 8 mm) having a diameter of 144 mm and an entire length of 152 mm was prepared. On the other hand, 70 parts by mass of an active alumina, 20 parts by mass of ceria, 10 parts by mass of zirconia, a noble metal component (a dinitrodiammine platinum nitric acid), and water were mixed, and then wet milling was performed like Example 6 to prepare a catalytic slurry. A solid content (a catalytically active component) contained in the prepared catalytic slurry had a maximum particle diameter (a particle diameter corresponding to 95% in a quantity distribution) of 40 μm and a minimum particle diameter (a particle diameter corresponding to 5% in the quantity distribution) of 2 μm. Further, a viscosity of the catalytic slurry was equal to or below 15 mPa·s.

The catalytic slurry was flowed in from one end surface side (the outlet side) by the suction method to be applied to the prepared honeycomb structure, and heating and drying were carried out to obtain a honeycomb catalyst (Example 10). Table 3 shows catalytically active component-loading amounts on the partition wall inlet-side surface, the pore inner surface, and the partition wall outlet-side surface. Incidentally, the catalytically active component-loading amount on the partition wall outlet-side surface was larger than the catalytically active component-loading amount on the partition wall inlet-side surface since the catalytic slurry was flowed in from the outlet side of the honeycomb structure like Example 6.

Example 11

A honeycomb structure (a partition wall thickness: 12 mil, a cell density: 300 cpsi, a porosity: 65%, an average pore diameter: 390 μm, a maximum pore diameter: 689 μm, a minimum pore diameter: 278 μm, a plugging depth: 8 mm) having a diameter of 144 mm and an entire length of 152 mm was prepared. On the other hand, 70 parts by mass of an active alumina, 20 parts by mass of ceria, 10 parts by mass of zirconia, a noble metal component (a dinitrodiammine platinum nitric acid), and water were mixed, and then wet milling was performed like Example 6 to prepare a catalytic slurry. A solid content (a catalytically active component) contained in the prepared catalytic slurry had a maximum particle diameter (a particle diameter corresponding to 95% in a quantity distribution) of 40 μm and a minimum particle diameter (a particle diameter corresponding to 5% in the quantity distribution) of 2 μm. Further, a viscosity of the catalytic slurry was equal to or below 15 mPa·s.

The catalytic slurry was flowed in from one end surface side (the outlet side) by the suction method to be applied to the prepared honeycomb structure, and heating and drying were carried out to obtain a honeycomb catalyst (Example 11). Table 3 shows catalytically active component-loading amounts on the partition wall inlet-side surface, the pore inner surface, and the partition wall outlet-side surface. Incidentally, the catalytically active component-loading amount on the partition wall outlet-side surface was larger than the catalytically active component-loading amount on the partition wall inlet-side surface since the catalytic slurry was flowed in from the outlet side of the honeycomb structure like Example 6.

TABLE 3

| | Loading amounts of various components (g/L) | | | | | | | |
|---|---|---|---|---|---|---|---|---|
| | Partition wall inlet-side surface | | | | Pore inner surface | | | |
| | Oxide component | Noble metal | Copper ion exchange type zeolite | β-type zeolite | Oxide component | Noble metal | Copper ion exchange type zeolite | β-type zeolite |
| Example 6 | 40 | 0.4 (Pt) | — | — | 80 | 0.8 (Pt) | — | — |
| Example 7 | — | — | 30 | — | — | — | 50 | — |
| Example 8 | 40 | 0.4 (Pt) | — | 100 | 80 | 0.8 (Pt) | — | — |
| Example 9 | 40 | 0.4 (Pt) | — | — | 80 | 0.8 (Pt) | — | — |
| Example 10 | 40 | 0.4 (Pt) | — | — | 80 | 0.8 (Pt) | — | — |
| Example 11 | 40 | 0.4 (Pt) | — | — | 80 | 0.8 (Pt) | — | — |

| | Loading amounts of various components (g/L) Partition wall outlet-side surface | | | | Loader configuration | | | |
|---|---|---|---|---|---|---|---|---|
| | Oxide component | Noble metal | Copper ion exchange type zeolite | β-type zeolite | Porosity (μm) | Maximum pore diameter (μm) | Average pore diameter (μm) | Minimum pore diameter (μm) |
| Example 6 | 80 | 0.8 (Pt) | — | — | 55 | 102 | 78 | 21 |
| Example 7 | — | — | 100 | — | 55 | 102 | 78 | 21 |
| Example 8 | 80 | 0.8 (Pt) | — | — | 55 | 102 | 78 | 21 |
| Example 9 | 80 | 0.8 (Pt) | — | — | 55 | 402 | 278 | 151 |
| Example 10 | 80 | 0.8 (Pt) | — | — | 61 | 456 | 320 | 221 |
| Example 11 | 80 | 0.8 (Pt) | — | — | 65 | 689 | 390 | 278 |

(Measurement of Purification Ratio, Pressure Loss Judgment)

Measurement of a purification ratio and a pressure loss judgment were carried out with respect to each of the manufactured honeycomb catalysts of Examples 1 to 11 and Comparative Examples 1 to 3. Table 4 shows the result. Incidentally, Table 4 shows "$(M_W):(M_P)$" of each honeycomb catalyst.

TABLE 4

| | | Purification ratio (%) | | | | |
|---|---|---|---|---|---|---|
| | $(M_W):(M_P)$ | Measurement condition (1) | Measurement condition (2) | Measurement condition (3) | Measurement condition (4) | Pressure loss judgment |
| Example 1 | 70.6:70.5 | 95 | 91 | — | — | ○ |
| Example 2 | 90.85:30.3 | 94 | 88 | — | — | ○ |
| Example 3 | 40.4:31.2 | 96 | — | — | — | ○ |
| Example 4 | 90:141.5 | 98 | — | — | — | ○ |
| Example 5 | 131.2:70.5 | 93 | 72 | — | — | ○ |
| Example 6 | 121.2:80.8 | 95 | — | — | 25 | ○ |
| Example 7 | 130:50 | — | — | 98 | — | ○ |
| Example 8 | 121.2:80.8 | 94 | — | — | 78 | ○ |
| Example 9 | 121.2:80.8 | 99 | — | — | — | ○ |
| Example 10 | 121.2:80.8 | 99 | — | — | — | ○ |
| Example 11 | 121.2:80.8 | 99.5 | — | — | — | ○ |

TABLE 4-continued

|  | $(M_w):(M_P)$ | Purification ratio (%) | | | | Pressure loss judgment |
|---|---|---|---|---|---|---|
|  |  | Measurement condition (1) | Measurement condition (2) | Measurement condition (3) | Measurement condition (4) | |
| Comparative Example 1 | 101:<0.51 | 56 | — | — | — | ○ |
| Comparative Example 2 | 5.06:252.2 | 88 | — | — | — | x |
| Comparative Example 3 | 141.4:10.1 | 48 | — | — | — | ○ |

As apparent from the result shown in Table 4, the honeycomb catalysts of Examples 1 to 6 and 8 to 11 demonstrate the excellent purification ratios (%) as compared with the honeycomb catalysts of Comparative Examples 1 to 3. Furthermore, it was revealed that the honeycomb catalysts of all Examples have small pressure loss values. Incidentally, it is clear from the result of Example 7 that the excellent purification ratio is demonstrated even when the copper ion exchange type zeolite (an SCR catalyst for $NO_x$ selective reduction) is used. On the other hand, the honeycomb catalyst of Comparative Example 2 has a large pressure loss value. It can be presumed that the pressure loss value is large because an amount of the catalytically active component loaded on the inner surface of each pore is excessive to obstruct passage of the gas as compared with an amount of the catalytically active component loaded on the surface of each partition wall.

Incidentally, considering the result (the measurement condition (2)) obtained by measuring the purification ratio of the exhaust gas containing $SO_2$ in each of the honeycomb catalysts of Examples 1, 2, and 5, it is apparent that the honeycomb catalysts of Examples 1 and 2 demonstrate the excellent purification ratios as compared with the honeycomb catalyst of Example 5. It can be presumed that the honeycomb catalyst of Example 5 has the inferior purification ratio because Pd having relatively low poisoning resistance is loaded as the catalytically active component on the partition wall inlet-side surface of the honeycomb catalyst of Example 5.

Moreover, considering the result (the measurement condition (4)) obtained by measuring the purification ratio of the exhaust gas containing toluene in each of the honeycomb catalysts of Examples 6 and 8, it is apparent that the honeycomb catalyst of Example 8 demonstrates the excellent purification ratio as compared with the honeycomb catalyst of Example 6. That is because toluene once adsorbed by β-type zeolite as the adsorbent under the low-temperature condition is presumed to be desorbed from the adsorbent due to an increase in temperature and then purified by the catalytically active component.

Considering the measurement condition (1) in regard to the honeycomb catalysts of Examples 9 to 11, it is apparent that these honeycomb catalysts demonstrate the excellent purification ratios as compared with the honeycomb catalysts of the other examples (Examples 1 to 6). That is because catalyst loading properties are presumed to be improved by enlarging the average pore in each honeycomb structure so that each of these catalysts effectively functions.

INDUSTRIAL APPLICABILITY

The honeycomb catalyst of the present invention has the excellent purification efficiency and a small pressure loss, and can be mounted even in a limited space. Therefore, the honeycomb catalyst of the present invention can be suitably used for purification of unpurified components contained in exhaust gases discharged from fixed engines, combustion devices and the like for cars, construction machines and industries.

The invention claimed is:

1. A honeycomb catalyst comprising:
    porous partition walls each having a first surface and a second surface and a plurality of pores, the partition walls being arranged to form a plurality of cells that allow communication between two end faces;
    plugging portions arranged to plug the cells in one of the end faces; and
    a catalytically active component loaded on the first and second surfaces of the partition walls and inner surfaces of the pores,
    wherein the catalytically active component-loading pores allow a gas to pass therethrough, and
    a ratio of a mass $(M_w)$ to a mass $(M_p)$ is $(M_w):(M_p)=1:3$ to 3:1
    where $(M_w)$ is a mass of the catalytically active component loaded on the first and second surfaces of the partition walls per unit volume of the partition walls, and
    $(M_p)$ is a mass of the catalytically active component loaded on the inner surfaces of the pores per unit volume of the partition walls.

2. The honeycomb catalyst according to claim 1,
    wherein a mass $(M_{w1})$ of the catalytically active component loaded on the first surface of the partition walls per unit volume of the partition walls is larger than a mass $(M_{w2})$ of the catalytically active component loaded on the second surface of the partition walls per unit volume of the partition walls.

3. The honeycomb catalyst according to claim 2,
    wherein the mass $(M_{w1})$ of the catalytically active component loaded on the first surface of the partition walls per unit volume of the partition walls and the mass $(M_{w2})$ of the catalytically active component loaded on the second surface of the partition walls per unit volume of the partition walls satisfy a relationship of $(M_{w1}) \geq 1.5 \times (M_{w2})$.

4. The honeycomb catalyst according to claim 1,
    wherein the catalytically active component includes a first catalytically active component and a second catalytically active component having poisoning resistance lower than that of the first catalytically active component, and
    a mass of the second catalytically active component loaded on the inner surfaces of the pores per unit volume of the partition walls and/or a mass of the second catalytically active component loaded on the first surface of the partition walls per unit volume of the partition walls is larger than a mass of the second catalytically active component loaded on the second surface of the partition walls per unit volume of the partition walls.

5. The honeycomb catalyst according to claim 1, wherein a hydrocarbon-based molecule adsorbent, which mainly contains zeolite, is further loaded on at least one surface of the partition walls.

6. The honeycomb catalyst according claim 1, wherein the catalytically active component is at least one selected from the group consisting of: (1) a three-way catalyst for purification of an exhaust gas from a gasoline engine, (2) an oxidation catalyst for purification of hydrocarbon, carbon monoxide, or soot, (3) an SCR catalyst for $NO_x$ selective reduction, (4) an $NO_x$ storage catalyst, (5) a four-way catalyst having a three-way purifying function and a soot purifying function, and (5) a catalyst which is used to purify oxide-based harmful components contained in a combustion exhaust gas.

7. A manufacturing method of a honeycomb catalyst, comprising:
applying a first catalytic slurry containing a particulate catalytically active component whose maximum particle diameter is smaller than a maximum pore diameter of pores to a honeycomb structure comprising porous partition walls having a plurality of pores, which are arranged to form a plurality of cells allowing communication between two end faces; and plugging portions arranged to plug the cells in one of the end faces to load the catalytically active component on inner surfaces of pores; and
subsequently applying a second catalytic slurry containing a particulate catalytically active component, whose minimum particle diameter is larger than the maximum pore diameter of the pores, to the honeycomb structure to load the catalytically active component on surfaces of partition walls; thereby
obtaining the honeycomb catalyst in which the catalytically active component-loading pores, which allow a gas to pass therethrough, are formed in partition walls and a ratio of a mass ($M_w$) of the catalytically active component loaded on surfaces of the partition walls per unit volume of the partition walls to a mass ($M_p$) of the catalytically active component loaded on the inner surfaces of the pores is ($M_w$):($M_p$)=1:3 to 3:1.

8. A manufacturing method of a honeycomb catalyst, comprising:
applying a third catalytic slurry containing a particulate catalytically active component of a predetermined viscosity to a honeycomb structure comprising the porous partition walls having a plurality of pores, which are arranged to form the plurality of cells allowing communication between two end faces; and plugging portions arranged to plug the cells in one of the end faces to load the catalytically active component on inner surfaces of pores; and subsequently
applying a fourth catalytic slurry which contains a particulate catalytically active component and has a higher viscosity than that of the third catalytic slurry to the honeycomb structure to load the catalytically active component on surfaces of partition walls, thereby
obtaining the honeycomb catalyst in which the catalytically active component-loading pores, which allow a gas to pass therethrough, are formed in the partition walls and a ratio of a mass ($M_w$) of the catalytically active component loaded on surfaces of the partition walls per unit volume of the partition walls to a mass ($M_p$) of the catalytically active component loaded on the inner surfaces of the pores is ($M_w$):($M_p$)=1:3 to 3:1.

* * * * *